(12) United States Patent
Morimoto et al.

(10) Patent No.: US 9,789,851 B2
(45) Date of Patent: Oct. 17, 2017

(54) DISCONNECTION DETECTION DEVICE

(71) Applicant: YAZAKI CORPORATION, Tokyo (JP)

(72) Inventors: Mitsuaki Morimoto, Shizuoka (JP); Gosei Sato, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/210,001

(22) Filed: Jul. 14, 2016

(65) Prior Publication Data
US 2016/0318478 A1 Nov. 3, 2016

Related U.S. Application Data

(63) Continuation of application No. PCT/JP2015/050985, filed on Jan. 15, 2015.

(30) Foreign Application Priority Data

Jan. 17, 2014 (JP) .................................. 2014-006433

(51) Int. Cl.
*B60R 25/10* (2013.01)
*B60R 25/104* (2013.01)
(Continued)

(52) U.S. Cl.
CPC .............. *B60R 25/104* (2013.01); *B60C 5/00* (2013.01); *B60R 25/24* (2013.01); *B60R 25/34* (2013.01); *G08B 13/14* (2013.01); *G08B 29/06* (2013.01)

(58) Field of Classification Search
CPC ... B60R 21/16; B60R 25/1004; B60R 25/104; B60R 25/34; B60R 2025/1013; B60C 5/00; B60Q 11/00; G08B 21/00
(Continued)

(56) References Cited

U.S. PATENT DOCUMENTS 4,835,514 A * 5/1989 Masegi ............... B60R 25/1018
180/287
5,463,258 A * 10/1995 Filion .................... B60Q 5/003
200/61.54
(Continued)

FOREIGN PATENT DOCUMENTS

CN 201207216 Y 3/2009
CN 102074229 A 5/2011
(Continued)

OTHER PUBLICATIONS

English language Written Opinion of the International Search Report for PCT/JP2015/050985 dated Apr. 14, 2015.
(Continued)

*Primary Examiner* — Hoi Lau
(74) *Attorney, Agent, or Firm* — Kenealy Vaidya LLP

(57) ABSTRACT

A disconnection detection device is provided with a disconnection detection unit including a constant current circuit configured to supply a constant current for disconnection detection to at least two horns through wire harnesses, and a disconnection detection circuit configured to determine the presence or absence of disconnection of the wire harnesses by monitoring an output voltage of the constant current circuit and configured to supply drive power through the wire harnesses by turning on the contact circuit independently of the horn switch in a case where disconnection of the wire harnesses has been detected. The disconnection detection unit is disposed in the relay box along with the plug-in relay.

7 Claims, 10 Drawing Sheets

(51) Int. Cl.
  *B60R 25/34* (2013.01)
  *B60R 25/24* (2013.01)
  *B60C 5/00* (2006.01)
  *G08B 29/06* (2006.01)
  *G08B 13/14* (2006.01)

(58) Field of Classification Search
  USPC ......... 340/426.23, 426.24, 425.5, 426.1, 428
  See application file for complete search history.

(56) References Cited

U.S. PATENT DOCUMENTS

| | | | | |
|---|---|---|---|---|
| 5,623,245 | A * | 4/1997 | Gilmore | B60R 25/04 307/10.2 |
| 5,965,952 | A * | 10/1999 | Podoloff | B60Q 5/003 280/728.3 |
| 2006/0191730 | A1* | 8/2006 | Alden | B60K 28/06 180/272 |
| 2007/0080525 | A1* | 4/2007 | Mauriello | G07C 5/085 280/731 |
| 2007/0096893 | A1* | 5/2007 | Kondo | B62J 6/001 340/471 |
| 2007/0257783 | A1* | 11/2007 | Matsumoto | B60K 6/445 340/425.5 |
| 2008/0291034 | A1* | 11/2008 | Kernwein | B60Q 5/00 340/626 |
| 2013/0249680 | A1* | 9/2013 | Goto | B60Q 5/008 340/425.5 |
| 2016/0318477 | A1* | 11/2016 | Morimoto | B60R 25/40 |
| 2016/0318478 | A1* | 11/2016 | Morimoto | B60R 25/34 |
| 2016/0355179 | A1* | 12/2016 | Cannella | B60T 7/22 |

FOREIGN PATENT DOCUMENTS

| | | |
|---|---|---|
| CN | 102350980 A | 2/2012 |
| JP | 61-81251 A | 4/1986 |
| JP | 63-26286 Y2 | 7/1988 |
| JP | 63-145750 U | 9/1988 |
| JP | 2000-219104 A | 8/2000 |
| JP | 2003-125516 A | 4/2003 |
| JP | 2008-105527 A | 5/2008 |
| JP | 2009-280001 A | 12/2009 |

OTHER PUBLICATIONS

Chinese Office Action for the related Chinese Patent Application No. 201580004974.X dated May 26, 2017.
International Search Report and Written Opinion of the International Search Report for PCT/JP2015/050985 dated Apr. 14, 2015.

* cited by examiner

DISCONNECTION DETECTION DEVICE

CROSS REFERENCE TO RELATED APPLICATIONS

This application is a continuation of PCT application No. PCT/JP2015/050985, which was filed on Jan. 15, 2015 based on Japanese Patent Application (No. 2014-006433) filed on Jan. 17, 2014, the contents of which are incorporated herein by reference.

BACKGROUND OF THE INVENTION

Field of the Invention

The present invention relates to a disconnection detection device, and in particular, to a disconnection detection device which detects the cut (disconnection) of a wire harness connecting a relay and a horn.

Description of Related Art

An antitheft device for a vehicle has a detection sensor which detects abnormality relating to a theft of a vehicle, a sound generation device (siren) which generates alarm sound in order to make surrounding people recognize offenses and to issue a warning (including a threat) to a thief, and a main unit which determines the presence or absence of a theft based on a detection signal from the detection sensor and controls the output of alarm sound. In the antitheft device configured as above, in many cases, a horn device which is mounted as a standard feature in the vehicle and outputs horn sound or a separated horn (so-called security horn) is used as a siren (sound generation device).

A horn provided in the horn device is attached in an engine room or a vehicle front portion, such as a bumper attachment portion. For this reason, the thief inserts a tool or the like from a gap of a hood or a front grill, or a gap formed by prying or the like, whereby there is a problem in that the horn is destroyed. As a method of solving such a problem, a sound generation device for theft alarm and an antitheft control system described in Patent Literature 1: JP-A-2009-280001 are known. In the technique described in Patent Literature 1, a shield portion which resonates by the frequency of alarm sound generated from the horn is provided between the outside of the vehicle and the horn (siren for theft alarm), and the shield portion protects the horn. In addition, since the shield portion resonates at the frequency of alarm sound by alarm sound from the horn, the sound volume is prevented from being reduced due to alarm sound being shielded by the shield portion.
[Patent Literature 1] JP-A-2009-280001

According to a related art, since it is necessary to provide the shield portion which is not directly related to the original function of the horn, there is a problem in that the weight or cost of the horn is increased. In addition, in order to prevent alarm sound (horn sound and howling sound) from the horn from being completely shielded, it is necessary to provide a gap between the horn and the shield portion, and there is a problem in that the attachment space of the horn is increased.

A general horn device has a horn which outputs horn sound, a horn button which is disposed in a steering wheel, a relay which has a contact circuit being opened or closed in conjunction with the on/off state of the horn button and controls the on/off state of supply of drive power to the horn, and a wire harness which electrically connects the relay and the horn.

In particular, the horn (including the security horn) is attached in the engine room or the vehicle front portion, such as the bumper attachment portion. For this reason, the thief inserts a tool or the like from the gap of the hood or the front grill, or the gap formed by prying or the like, whereby there is a problem in that the wire harness which supplies drive power to the horn is cut. In particular, since drive power is not supplied to the horn due to the cut of the wire harness, there is a problem in that the effect of the antitheft device is substantially invalidated. Even in the configuration described in Patent Literature 1, since a main unit and the security horn are connected to each other by the wire harness, there is a concern that the same problem as in a case where a horn device is used as a sound generation device of an antitheft device occurs.

One or more embodiments provide a disconnection detection device capable of improving antitheft performance of a horn device body.

SUMMARY

In an aspect (1), one or more embodiments provide a disconnection detection device which is provided in a vehicle having a horn device including at least two horns configured to generate horn sound, a horn switch configured to be turned on/off corresponding to an operation of a horn button, a plug-in relay disposed in a relay box and configured to supply drive power to the two horns by turning on a contact circuit corresponding to turning on the horn switch, and wire harnesses configured to electrically connect the plug-in relay and the two horns, the disconnection detection device comprising:

a disconnection detection unit including a constant current circuit configured to supply a constant current for disconnection detection to the two horns through the wire harnesses and a disconnection detection circuit configured to determine the presence or absence of disconnection of the wire harnesses by monitoring an output voltage of the constant current circuit and configured to supply drive power through the wire harnesses by turning on the contact circuit independently of the horn switch in a case where disconnection of the wire harnesses has been detected, wherein the disconnection detection unit is disposed in the relay box along with the plug-in relay.

In an aspect (2), one or more embodiments provide the disconnection detection device, wherein connection terminals for external connection of the disconnection detection unit are disposed similarly to connection terminals for external connection of the plug-in relay.

In an aspect (3), one or more embodiments provide the disconnection detection device, wherein the plug-in relay and the disconnection detection unit are formed integrally, and wherein a relay having the contact circuit, the constant current circuit, and the disconnection detection circuit are disposed in a same housing.

In an aspect (4), one or more embodiments provide the disconnection detection device, wherein connection terminals for external connection electrically connecting the constant current circuit, the disconnection detection circuit, and the relay which are disposed in the same housing, are disposed similarly to connection terminals for external connection of the plug-in relay.

In an aspect (5), one or more embodiments provide the disconnection detection device, further comprising:

a constant current supply control circuit which alternately performs the supply and stop of the constant current for disconnection detection supplied from the constant current circuit.

In an aspect (6), one or more embodiments provide a disconnection detection device which is provided in a vehicle having a horn device including at least two horns configured to output horn sound, a horn switch configured to be turned on/off corresponding to an operation of a horn button, a plug-in relay disposed in a relay box and configured to supply drive power to the two horns by turning on a contact circuit corresponding to turning on the horn switch, and first wire harnesses configured to electrically connect the plug-in relay and the two horns, the disconnection detection device comprising:

a second wire harness which is arranged along the first wire harnesses; and a disconnection detection unit which includes a current circuit configured to supply a current for disconnection detection to the second wire harness and a disconnection detection circuit configured to monitor an output voltage of the current circuit and configured to supply drive power through the first wire harnesses by turning on the contact circuit independently from the horn switch in a case where disconnection of the second wire harness has been detected, wherein the disconnection detection unit is disposed in the relay box along with the plug-in relay.

In an aspect (7), one or more embodiments provide the disconnection detection device, further comprising:

a current supply control circuit which alternately performs the supply and stop of the current for disconnection detection supplied from the current circuit.

According to the aspect (1), the plug-in relay which is turned on/off corresponding to the horn switch and supplies drive power from a battery to each of the two horns, and the disconnection detection unit which includes the constant current circuit configured to supply the constant current to the wire harnesses supplying drive power to the two horns and the disconnection detection circuit configured to monitor the output voltage of the constant current circuit and to supply drive power to the horns by controlling the plug-in relay at the time of disconnection of the wire harnesses are disposed in the same relay box. Accordingly, even in a case of cutting the wire harnesses to invalidate the horn device, since horn sound can be output from one horn as alarm sound, it is possible to improve antitheft performance of a horn (horn device) for outputting horn sound.

According to the aspect (2), the disconnection detection unit is disposed similarly to the plug-in relay, that is, has the connection terminals for external connection at the same positions as the plug-in relay. Accordingly, in a case where a horn device is used as an alarm device in a vehicle or the like including an antitheft device, it is possible to dispose (mount) the disconnection detection unit using the connection terminals on the relay box side for disposing (connecting) the plug-in relay for a security horn provided in the relay box. As a result, even in a case where the disconnection detection unit is attached later, it is possible to easily attach the disconnection detection unit.

According to the aspects (3) and (4), the relay disposed in the plug-in relay and the disconnection detection unit are formed in the same housing, and the connection terminals for external connection are disposed similarly to connection terminals for external connection of the plug-in relay, that is, are formed at the same positions as connection terminals for external connection of the plug-in relay. Accordingly, even in a case where the disconnection detection unit is attached later, since the disconnection detection unit can be attached only by replacing the plug-in relay with the disconnection detection unit, it is possible to significantly reduce an attachment work of the disconnection detection unit.

According to the aspect (5), the constant current supply control circuit which alternately performs the supply and stop of the constant current for disconnection detection supplied from the constant current circuit is provided, whereby it is possible to significantly reduce power consumption necessary for disconnection detection since the constant current is output discontinuously (intermittently).

According to the aspect (6), the plug-in relay which is turned on/off corresponding to the horn switch and supplies drive power from a battery to each of the two horns, and the disconnection detection unit which includes the current circuit configured to supply the current for disconnection detection to the second wire harness arranged along the first wire harnesses and the disconnection detection circuit configured to monitor the output voltage of the current circuit and to supply drive power to the horns through the first wire harnesses by controlling the plug-in relay at the time of disconnection of the second wire harness are disposed in the same relay box. Accordingly, even in a case of cutting the first wire harnesses to invalidate the horn device, since the second wire harness is cut along with the first wire harnesses, horn sound can be output as alarm sound from one horn. As a result, it is possible to improve antitheft performance of a horn (horn device) for outputting horn sound.

According to the aspect (7), the current supply control circuit which alternately performs the supply and stop of the current for disconnection detection supplied from the current circuit is provided, whereby it is possible to significantly reduce power consumption necessary for disconnection detection since the current for disconnection detection is output discontinuously (intermittently).

DETAILED DESCRIPTION OF THE EMBODIMENTS

Figure 1:
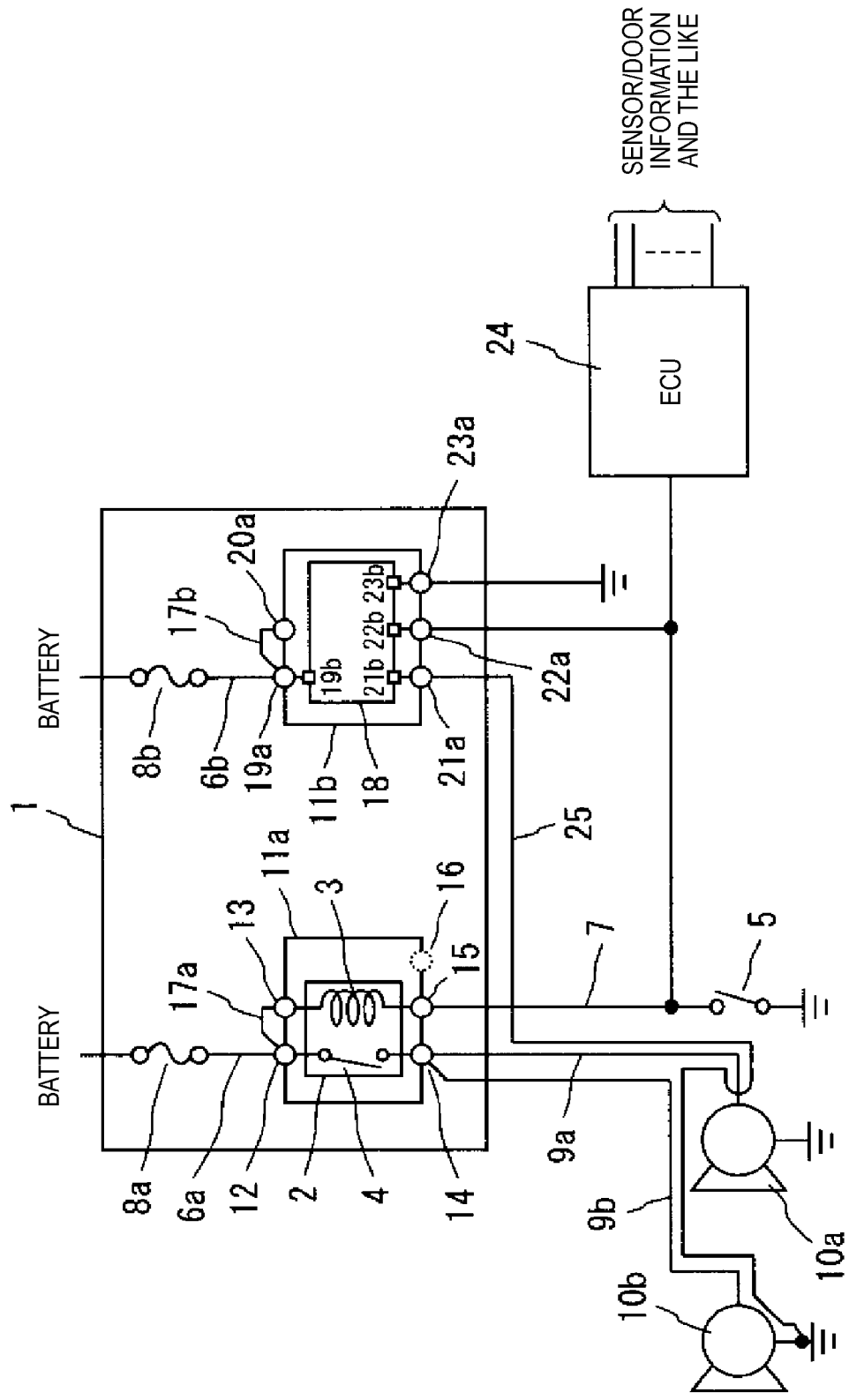
FIG. 1 is a diagram illustrating the schematic configuration of a horn device including a disconnection detection device of Embodiment 1 of the invention.

Exemplary embodiments will be described referring to the drawings. In the following description, the same components are represented by the same reference numerals and repetitive description will be omitted.

Embodiment 1

FIG. 1 is a diagram illustrating the schematic configuration of a horn device including a disconnection detection device of Embodiment 1 of the invention. Hereinafter, the disconnection detection device of Embodiment 1 and the horn device including the same will be described referring to FIG. 1. The horn device of Embodiment 1 has the same configuration as that of a conventional horn device excluding a disconnection detection unit 18 constituting the disconnection detection device, a wire harness 25 for disconnection detection, and connection terminals 16 and 23a of a relay box 1, and thus, in the following description, the disconnection detection device will be described in detail. In regard to the horn device shown in FIG. 1, a body ground type in which a minus terminal of a battery, that is, a ground (GND) is connected to a vehicle body (not shown) will be described. In addition, in the following description, in a case of connecting the horn device to a plus terminal of the battery, this is simply abbreviated as "connection to a power supply". When connecting the horn device to the plus terminal of the battery, even if the horn device is connected to the plus terminal of the battery through a wire harness and fuses 8a and 8b, this is abbreviated as "connection to a power supply".

As shown in FIG. 1, the horn device including the disconnection detection device of Embodiment 1 has a configuration in which a known plug-in type relay (hereinafter, referred to as a plug-in relay) 2 configured to supply drive power to horns 10a and 10b and a disconnection detection unit 18 are disposed in a known relay box 1. At this time, in Embodiment 1, the disconnection detection unit 18 is formed of a plug-in type housing (a housing having an exterior and protrusion terminals), and is attached (disposed) in the relay box 1 along with the plug-in relay 2. In particular, in the configuration of Embodiment 1, as described below in detail, the plug-in type disconnection detection unit 18 is attached to a portion 11b which is a region adjacent to a portion 11a, to which the plug-in relay 2 is attached, and to which a plug-in relay driving a security horn is attached. That is, in the configuration of Embodiment 1, the two horns 10a and 10b provided in the horn device are used as a security horn constituting an antitheft device, and horn sound is output as alarm sound.

As will be apparent from FIG. 1, in the configuration of Embodiment 1, a connection terminal (female terminal) 12 disposed in the relay box 1 is connected to a power supply (a plus terminal of a battery (not shown)) through a wire harness 6a and a fuse 8a. The connection terminal 12 is electrically connected to a connection terminal (female terminal) 13 of the relay box 1 through a wiring 17a. With this configuration, one terminal of a coil 3 forming the known plug-in relay 2 as a horn relay is connected to the power supply through the connection terminal 12 of the relay box 1. The other terminal of the coil 3 is electrically connected to a known horn SW (horn switch) 5 through a connection terminal (female terminal) 15 of the relay box 1 and a wire harness 7. With this, the on/off state of the plug-in relay 2, that is, the on/off state of the contact circuit 4 is controlled by the on/off state of the horn SW 5 corresponding to an operation of a horn button disposed in a steering wheel.

Although the relay box 1 of Embodiment 1 includes a connection terminal (female terminal) 16 which is not connected to any terminal, the connection terminal 16 may not be provided. However, even in a vehicle in which a horn device is used instead of a conventional security horn described below, or an antitheft device is not disposed, since the disconnection detection unit 18 which detects disconnection of wire harnesses 9a and 9b of the horn device can be easily mounted later, it is preferable that a connection terminal corresponding to the disconnection detection unit 18 is provided, that is, the connection terminal 16 is provided. In addition, the connection terminal 16 may be connected to the ground (GND) in advance so as to have the same configuration as that of a connection terminal 23a.

In the contact circuit 4 forming the plug-in relay 2, one terminal of the contact circuit 4 is connected to the power supply through the connection terminal 12 of the relay box, and the other terminal of the contact circuit 4 is respectively connected to the two horns 10a and 10b through a connection terminal (female terminal) 14 of the relay box 1 and wire harnesses (first wire harnesses) 9a and 9b connected to the connection terminal 14. At this time, in the horn device of Embodiment 1, the horn 10a is connected to the wire harness 9a, and the horn 10b is connected to the wire harness 9b. In the two horns 10a and 10b, one horn 10a is a horn which outputs high-tone horn sound (howling sound), and the other horn 10b is a horn which outputs low-tone horn sound (howling sound). For the two horns 10a and 10b, two horns which output the same horn sound (howling sound) may be used, and three or more horns may be used.

In general, the horn SW 5 is disposed in the vehicle interior, the relay box 1 is provided on a side in the engine room close to the vehicle interior, and the two horns 10a and 10b and the wire harnesses 9a and 9b are disposed on the front side in the engine room. For this reason, the wire harnesses 9a and 9b disposed on the front side in the engine room are likely to be cut. That is, there is a high possibility that portions of the wire harnesses 9a and 9b close to the two horns 10a and 10b are cut.

As described below, in the disconnection detection unit 18 of Embodiment 1, first, the cut of a wire harness (second wire harness) 25 for disconnection detection disposed along the wire harnesses 9a and 9b respectively connected to the two horns 10a and 10b constituting the horn device is detected. Next, when disconnection is detected, it is determined that at least one wire harness of the wire harnesses 9a and 9b is cut. With this determination result, the horn is driven to output horn sound through the uncut wire harness; thus, it is preferable that the two horns 10a and 10b are disposed to be separated from each other. In addition, it is preferable that the wire harnesses 9a and 9b connected to the respective horns are arranged to be separated from each other. However, as a configuration in which the wire harness 25 for disconnection detection is disposed along the wire harnesses 9a and 9b, for example, it is preferable that the wire harness 25 is wound by a tape along with the wire harnesses 9a and 9b assumed to be cut by the thief, that is, subjected to disconnection detection, that is, the wire harnesses apparently become one wire harness. More preferably, an electric cable in which a conductor to be the wire harnesses 9a and 9b subjected to disconnection detection and a conductor to be the wire harness 25 for disconnection detection are disposed in the same insulating coating may be used.

In the configuration of the disconnection detection device of Embodiment 1, even in the portion 11*b* where the disconnection detection unit 18 is disposed adjacent to the plug-in relay 2, the plug-in type disconnection detection unit 18 is disposed using connection terminals (female terminal) 19*a* to 23*a* of the relay box 1 provided to dispose a plug-in relay driving a conventional security horn described below. At this time, the connection terminal 19*a* of the relay box 1 is connected to the power supply through a wire harness 6*b* and a fuse 8*b*. The connection terminal 19*a* is electrically connected to the connection terminal 20*a* of the relay box 1 through a wiring 17*b* in the relay box 1. In addition, the connection terminal 23*a* of the relay box 1 is connected to the ground (GND). With this configuration, power is supplied to the disconnection detection unit 18.

One end of the wire harness 25 for disconnection detection is electrically connected to the connection terminal 21*a* of the relay box 1, and the wire harness 25 for disconnection detection is arranged from the relay box 1 to the horn 10*a* along the wire harness 9*a*. The wire harness 25 for disconnection detection is folded and arranged on the relay box 1 side along the wire harness 9*a*, is arranged along the wire harness 9*b* in the middle, and reaches the horn 10*b*, and then, the end portion (the other end) thereof is electrically connected to the ground (GND).

In addition, the wire harness 7 is electrically connected to the connection terminal 22*a* of the relay box 1. With this configuration, the on state of the plug-in relay 2, that is, the output of horn sound from the horns 10*a* and 10*b* can be controlled along with the output from an ECU 24 as a main unit of the antitheft device independently from the horn SW 5.

In FIG. 1, when arranging the wire harness 25 for disconnection detection, the wire harness 25 is arranged along the wire harness 9*b* in the middle of the wire harness 9*a*; however, the invention is not limited thereto. For example, first, the wire harness 25 for disconnection detection is arranged from the relay box 1 along the wire harness 9*a* and reaches the horn 10*a*. Then, the wire harness 25 for disconnection detection is folded at the horn 10*a*, and is again arranged to the relay box 1 along the wire harness 9*a*. Thereafter, the wire harness 25 for disconnection detection is folded in the vicinity of the relay box 1, is arranged along the wire harness 9*b*, and reaches the horn 10*b*. Then, the other end of the wire harness 25 for disconnection detection is connected to the ground (GND).

Figure 2:
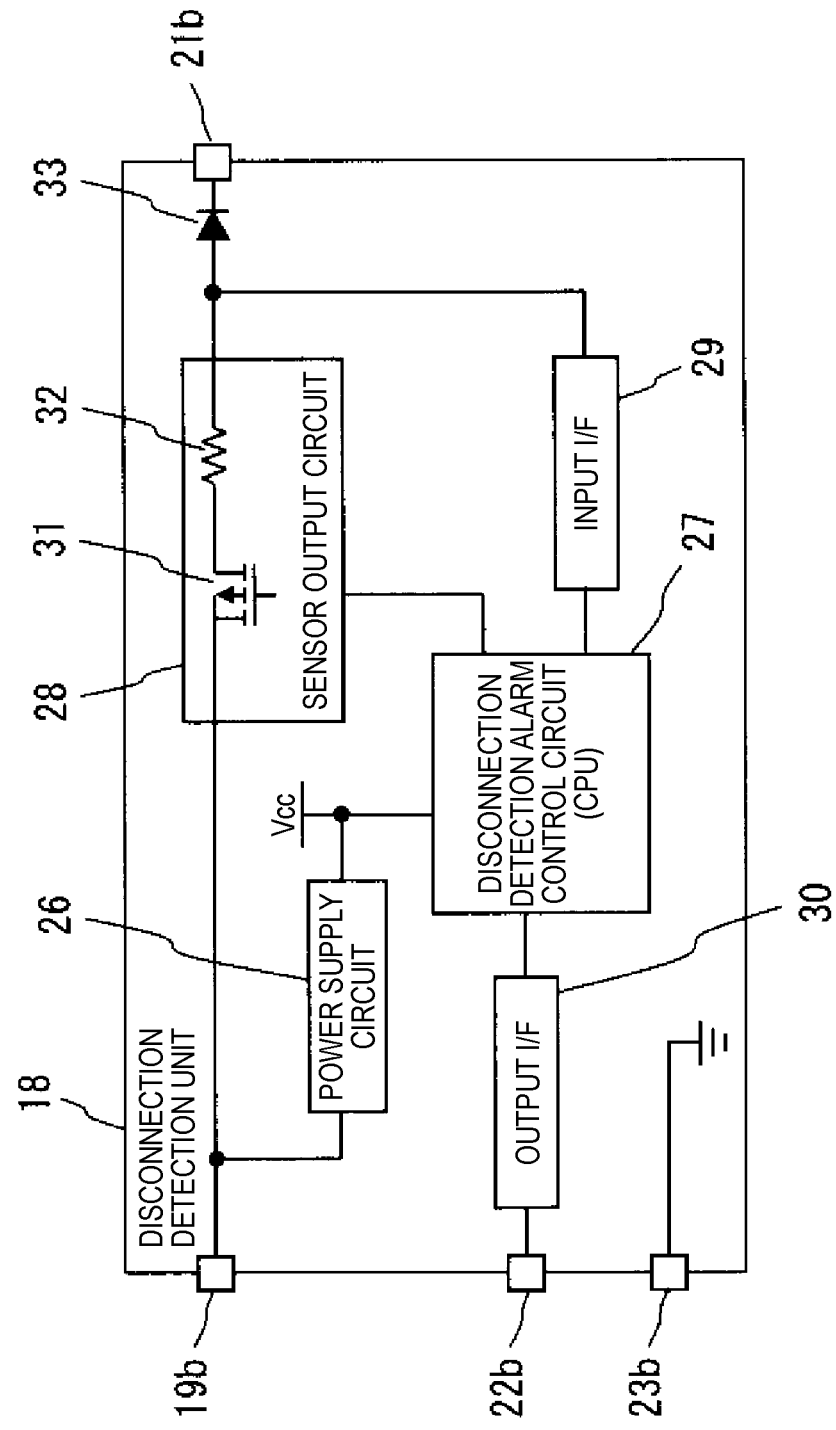
FIG. 2 is a diagram illustrating the schematic configuration of a disconnection detection unit of Embodiment 1 of the invention.

Next, FIG. 2 is a diagram illustrating the schematic configuration of the disconnection detection unit of Embodiment 1 of the invention. The configuration and operation of the disconnection detection unit 18 will be described referring to FIGS. 1 and 2. Connection terminals 19*b* and 21*b* to 23*b* in the peripheral portion of the disconnection detection unit 18 are male terminals on the disconnection detection unit 18 side which are respectively fitted and electrically connected to the connection terminals 19*a* and 21*a* to 23*a*. In the configuration of Embodiment 1, since power is also supplied to the connection terminal 20*a*, a connection terminal (male terminal) which is fitted to the connection terminal 20*a* may be provided, and power may be received from the connection terminal and the connection terminal 19*b*.

As shown in FIG. 2, power is input to the disconnection detection unit 18 of Embodiment 1 through the connection terminal 19*b* fitted to the connection terminal 19*a*, and power is supplied from the battery to a sensor output circuit (current circuit) 28 and a power supply circuit 26 constituting the disconnection detection unit 18 in the disconnection detection unit 18. The disconnection detection unit 18 is connected to the ground (GND) through the connection terminal 23*b* fitted to the connection terminal 23*a*.

The power supply circuit 26 to which power from the battery is directly supplied generates a power supply voltage Vcc from the supplied power and supplies the power supply voltage Vcc to a disconnection detection alarm control circuit 27.

The sensor output circuit 28 to which power from the battery is directly supplied includes a known MOS transistor 31 and a resistor (resistive element) 32 connected in series, and the power supply and the resistor 32 are electrically connected through the MOS transistor 31. The MOS transistor 31 functions as a supply control circuit which is turned on/off in response to an on/off control signal (clock signal or the like) supplied from the disconnection detection alarm control circuit 27 to limit power supply from the power supply to the resistor 32.

In particular, in the configuration of the disconnection detection unit 18 of Embodiment 1, power supply to the resistor 32 is limited by the MOS transistor 31, whereby the current for disconnection detection supplied to the wire harness 25 for disconnection detection through the resistor 32, a diode 33 connected in series to the resistor 32, and the connection terminal 21*b* fitted to the connection terminal 19*a* is reduced. When the MOS transistor 31 is in the on state, the resistor 32 is connected to the power input through the MOS transistor 31, and thus, functions as an element for pull-up. The resistor 32 also functions as an element which limits the amount of current output to the wire harness 25 for disconnection detection. In particular, the disconnection detection unit 18 operates in a case where the engine of the vehicle is stopped; thus, power consumption needs to be minimized. Accordingly, in the disconnection detection unit 18 of Embodiment 1, the resistor 32 having a large resistance value is used, and a period during which the current is supplied is limited by the MOS transistor 31, whereby the amount of current for disconnection detection applied to the wire harness 25 for disconnection detection is reduced. The resistor 32 having a large resistance value may be used, and the amount of current flowing in the resistor 32 may be significantly decreased, whereby the MOS transistor 31 may not be used, that is, the resistor 32 may be connected directly to the connection terminal 19*b*, and the current for disconnection detection may be constantly supplied to the wire harness 25 for disconnection detection.

The diode 33 is disposed to prevent the inflow of the current into the sensor output circuit 28 through the wire harness 25 for disconnection detection. Accordingly, the anode (positive electrode) of the diode 33 is connected to the resistor 32, and the cathode (negative electrode) of the diode 33 is connected to the wire harness 25 for disconnection detection through the connection terminal 21*b* fitted to the connection terminal 19*a*. The diode 33 may not be used, that is, the resistor 32 and the connection terminal 21*b* may be connected directly to each other.

An input I/F 29 has, for example, a known reference power supply (not shown) which generates a reference voltage and a known comparator, and is configured to compare the voltage between the resistor 32 and the diode 33, that is, an output voltage of the sensor output circuit 28 with the reference voltage. The output of the comparator is output to the disconnection detection alarm control circuit 27 as the output of the input I/F 29. With this, the disconnection detection alarm control circuit 27 can determine the presence or absence of disconnection of the wire harness 25 for disconnection detection based on the output timing of the on/off control signal and the output of the input I/F 29 (the output of the comparator). Specifically, in a case where the MOS transistor 31 is in the on state, and the wire harness 25 for disconnection detection is not disconnected (uncut), since the resistor 32 functions an element for pull-up, the voltage between the resistor 32 and the diode 33 substantially becomes the ground (GND) voltage. In a case where the MOS transistor 31 is in the on state, and the wire harness 25 for disconnection detection is disconnected (cut), since the resistor 32 is only connected to the power supply through the MOS transistor 31, the voltage between the resistor 32 and the diode 33 substantially becomes the voltage of the power supply (a voltage supplied from the connection terminal 21b). Accordingly, in the configuration of the disconnection detection device of Embodiment 1, although the reference voltage output from the reference power supply may be any voltage as long as the voltage is a voltage between substantially the voltage of the power supply and substantially the ground (GND) voltage, it is preferable that a voltage which is half the power supply voltage is set as a reference voltage. The configuration of the input I/F 29 is not limited to the above configuration, and for example, the input I/F 29 may perform known A/D conversion, the disconnection detection alarm control circuit 27 stores a reference voltage value as data, and the disconnection detection alarm control circuit 27 may compare the output voltage value of the sensor output circuit 28 converted by the input I/F 29 with the reference voltage value to determine disconnection.

The disconnection detection alarm control circuit 27 is, for example, a control circuit using a known CPU, and as described above, generates an on/off control signal to control the on/off state of the MOS transistor 31 of the sensor output circuit 28 and supplies the on/off control signal to the MOS transistor 31. The presence or absence of disconnection of the wire harness 25 for disconnection detection is determined based on the output (determination output) of the input I/F 29. In addition, an output I/F 30 is controlled based on the presence or absence of disconnection of the wire harness 25 for disconnection detection. In the control of the output I/F 30, after disconnection of the wire harness 25 for disconnection detection (including the wire harnesses 9a and 9b) is detected, the output and stop of horn sound are repeated. The output of horn sound may be continued.

The output I/F 30 has a known n-type MOS transistor (not shown), and a control signal from the disconnection detection alarm control circuit 27 is input to the gate terminal of the n-type MOS transistor. The drain terminal of the n-type MOS transistor is connected between the coil 3 of the plug-in relay 2 and the horn SW 5 through the connection terminal 22b fitted to the connection terminal 22a, and the source terminal of the n-type MOS transistor is connected to the ground (GND) input from the connection terminal. With this configuration, the n-type MOS transistor of the output I/F 30 is connected in parallel to the horn SW 5 and the ECU 24. As a result, the plug-in relay 2 is turned on based on the control signal from the disconnection detection alarm control circuit 27 through the connection terminal 22a fitted to the connection terminal 22b independently from the horn SW 5 and the ECU 24, whereby horn sound can be output from the horns 10a and 10b as alarm sound. In this way, in the disconnection detection device of Embodiment 1, the input I/F 29, the disconnection detection alarm control circuit 27, and the output I/F 30 constitute the disconnection detection circuit which controls the determination of disconnection of the wire harness 25 for disconnection detection and the output of horn sound at the time of disconnection.

In the disconnection detection device of Embodiment 1 including the disconnection detection unit 18 configured as above and the wire harness 25 for disconnection detection, the current for disconnection detection is supplied discontinuously from the sensor output circuit 28 to be a current circuit to the wire harness 25 for disconnection detection based on the control signal from the disconnection detection alarm control circuit 27. The input I/F 29 and the disconnection detection alarm control circuit 27 monitor the output of the sensor output circuit 28 and determine that the wire harnesses 9a and 9b are disconnected (cut) in a case where it is detected in the input I/F 29 that the input voltage to the input I/F 29 has become greater than the reference voltage at the time of the supply of the current for disconnection detection, and the disconnection detection alarm control circuit 27 controls the output I/F 30 to turn on the plug-in relay 2. When the plug-in relay 2 is turned on, at least the horn 10a or 10b connected to the uncut wire harness 9a or 9b is driven, and horn sound is output as alarm sound; therefore, it is possible to improve antitheft performance of the horn device.

Figure 3:
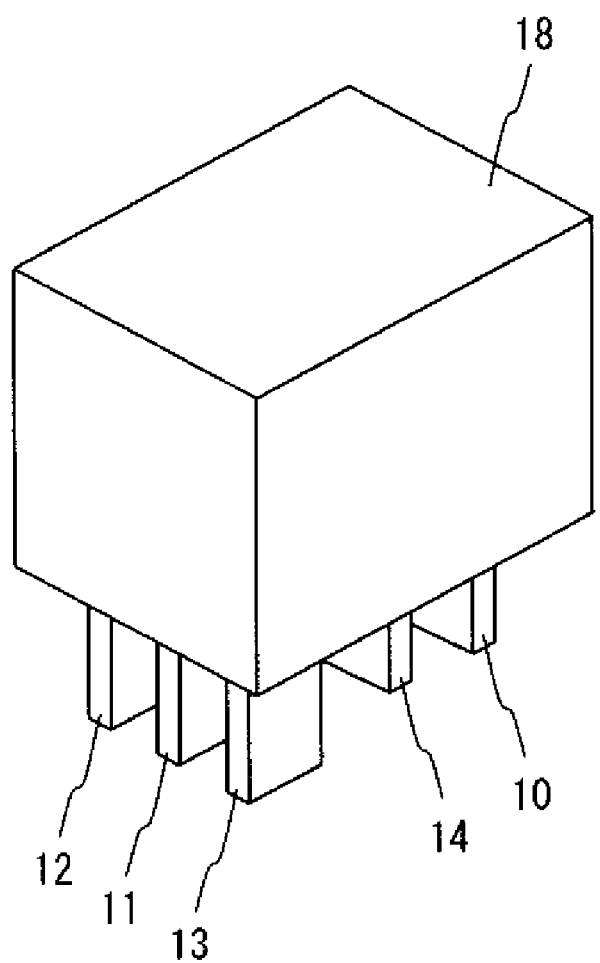
FIG. 3 is a diagram showing an example of the appearance shape of the disconnection detection unit of Embodiment 1 of the invention.

As shown in FIG. 3, the disconnection detection unit 18 of Embodiment 1 has the same appearance shape as that of the plug-in relay 2, and as described below in detail, and is replaced and disposed in the relay box 1 of a vehicle including a conventional security horn. At this time, since the connection terminals 19b and 21b to 23b of the disconnection detection unit 18 are fitted to at least the connection terminals 19a and 21a to 23a disposed in the relay box 1, the shapes and the arrangement positions of the connection terminals 19b and 21b to 23b of the disconnection detection unit 18 of Embodiment 1 are the same as those of the connection terminals of the conventional plug-in relay 2.

In addition, in the disconnection detection unit 18 of Embodiment 1, although the connection terminal fitted to the connection terminal 20a is not formed, the invention is not limited thereto. For example, the connection terminal 20b fitted to the connection terminal 20a may be provided in the disconnection detection unit 18, and the connection terminal 20b may not be connected to any of the circuits and the like forming the disconnection detection unit 18, or may be connected to a wiring through which power is supplied from the connection terminal 19b to the power supply circuit 26 and the sensor output circuit 28.

Figure 8:
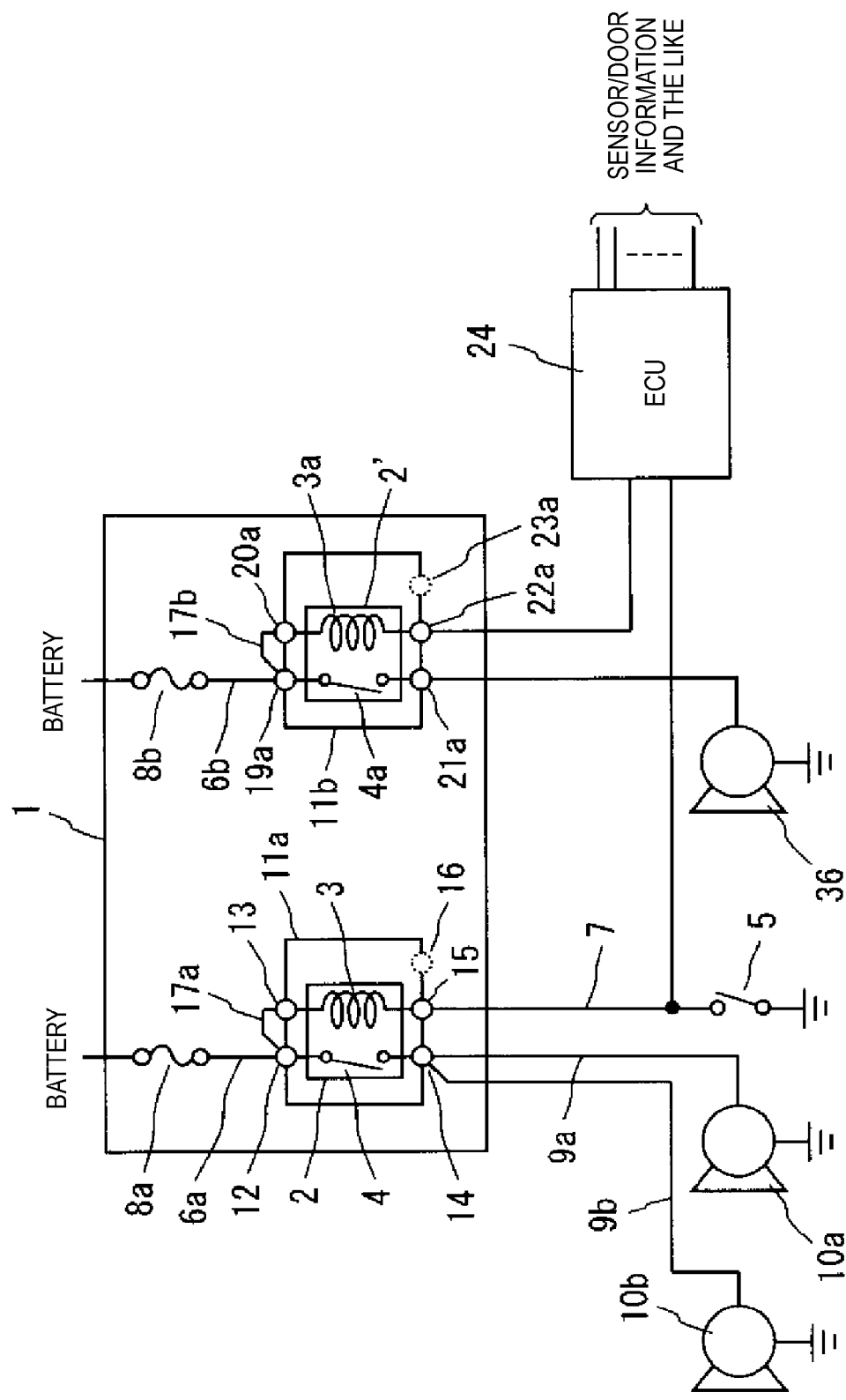
FIG. 8 is a diagram illustrating the schematic configuration of a conventional horn device in a vehicle including an antitheft device having a security horn.
Figure 9:
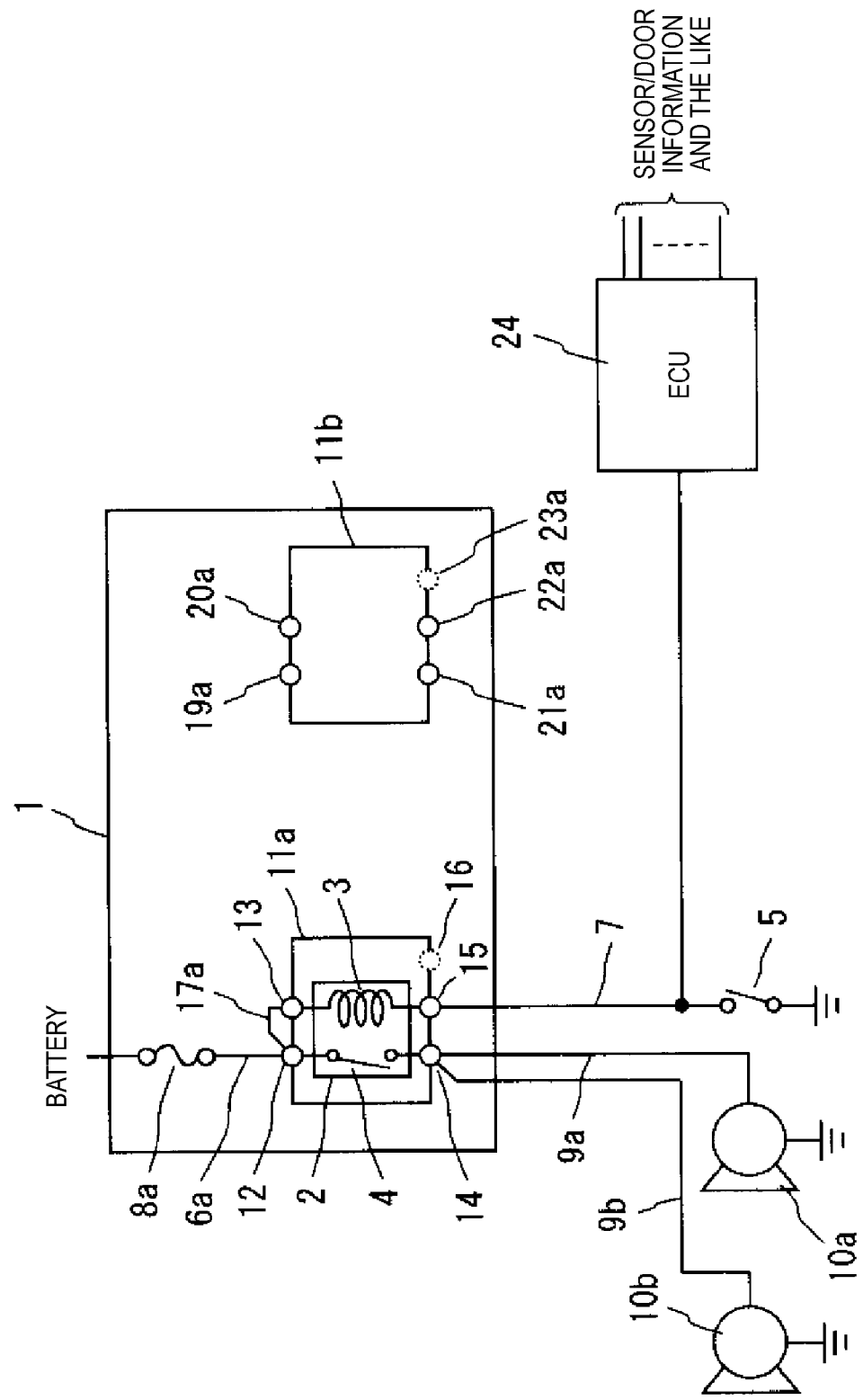
FIG. 9 is a diagram illustrating the schematic configuration of a conventional horn device in a vehicle including an antitheft device using a horn device as an alarm device.

FIG. 8 is a diagram illustrating the schematic configuration of a conventional horn device in a vehicle including an antitheft device having a security horn, and FIG. 9 is a diagram illustrating the schematic configuration of a conventional horn device in a vehicle including an antitheft device using a horn device as an alarm device.

As will be apparent from FIGS. 8 and 9, in a vehicle which has at least an antitheft device and can select the presence or absence of a security horn, connection terminals 19a to 23a for attaching a plug-in relay 2' for a security horn are disposed in a relay box 1. That is, since the plug-in relay 2' for a security horn also includes a coil 3a and a contact circuit 4a, connection terminals 19a to 23a which are the same connection terminals 12 to 16 as those of the plug-in relay 2 are disposed. At this time, in a conventional vehicle which uses a horn device instead of a security horn, nothing is disposed in a portion 11b in the relay box 1 for attaching the plug-in relay 2' for security horn.

Accordingly, as described above, the disconnection detection unit 18 of Embodiment 1 having at least the same shapes and arrangement positions as those of connection terminals of a conventional plug-in relay 2b can be easily disposed in the portion 11b for attaching the plug-in relay 2' for a security horn. In addition, the wire harness 25 for disconnection detection is disposed along the wire harnesses 9a and 9b, whereby it is possible to easily improve antitheft performance of the horn device. Even in a vehicle in which an antitheft device is not disposed, in a case where the portion 11b for attaching the plug-in relay 2' for a security horn is disposed in the relay box 1, as described above, it is possible to easily attach the disconnection detection device of Embodiment 1 later.

Embodiment 2

Figure 4:
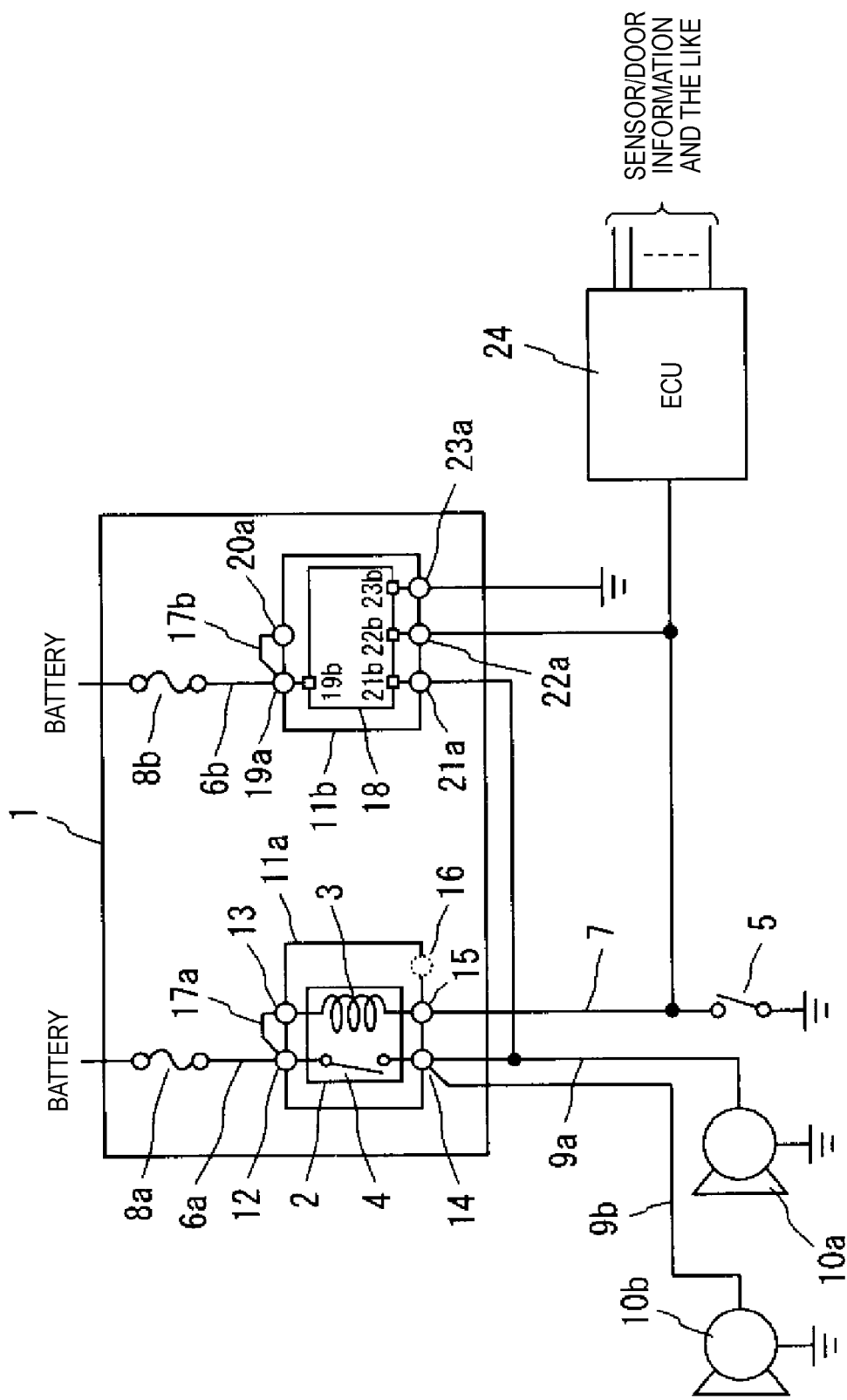
FIG. 4 is a diagram illustrating the schematic configuration of a horn device including a disconnection detection device of Embodiment 2 of the invention.
Figure 5:
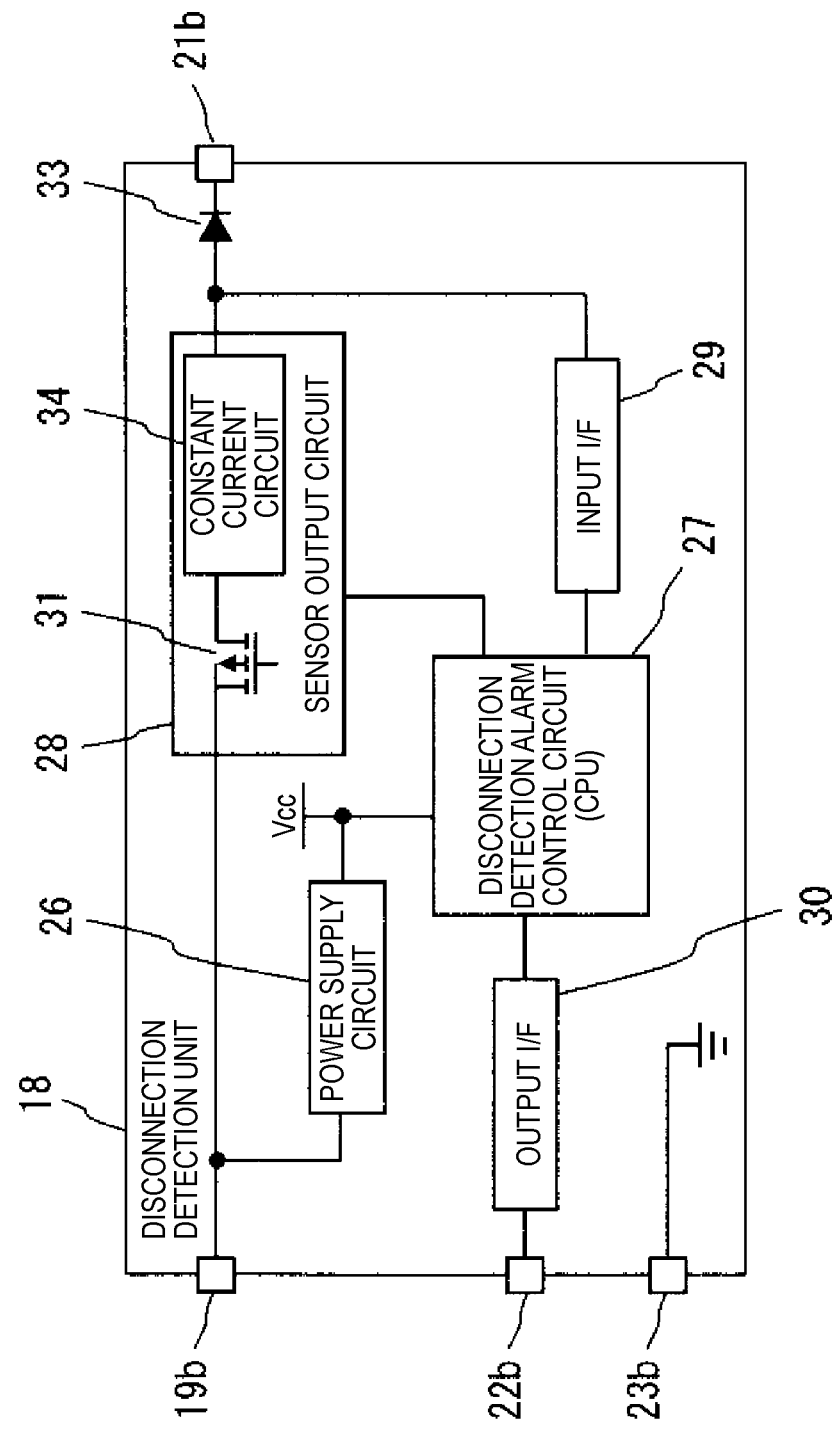
FIG. 5 is a diagram illustrating the schematic configuration of a disconnection detection unit of Embodiment 2 of the invention.

FIG. 4 is a diagram illustrating the schematic configuration of a horn device including a disconnection detection device of Embodiment 2 of the invention, and FIG. 5 is a diagram illustrating the schematic configuration of a disconnection detection unit of Embodiment 2 of the invention. Hereinafter, the disconnection detection device of Embodiment 2 and the horn device including the same will be described referring to FIGS. 4 and 5. The horn device of Embodiment 2 has the same configuration as that of the horn device including the disconnection detection device of Embodiment 1, except for the wire harness 25 for disconnection detection along the wire harnesses 9a and 9b subjected to disconnection detection not being arranged, the wire harness 9a being branched and connected to a connection terminal 21a, and the internal configuration of the disconnection detection unit 18. Accordingly, in the following description, the internal configuration of the disconnection detection unit 18 will be described in detail. In the configuration of Embodiment 2, although a wire harness 9a is branched in the vicinity of a plug-in relay 2 and connected to the connection terminal 21a, the invention is not limited thereto. For example, the connection terminal 14 and the connection terminal 21a may be electrically connected directly to each other using another wire harness.

As shown in FIG. 4, in the horn device including the disconnection detection device of Embodiment 2, the known plug-in relay 2 and the disconnection detection unit 18 are disposed in the known relay box 1. At this time, in Embodiment 2, the disconnection detection unit 18 is formed of a plug-in type housing (a housing having an exterior and protrusion terminals), and is disposed in the same relay box 1 along with the plug-in relay 2. In the configuration of Embodiment 2, as in Embodiment 1, the plug-in type disconnection detection unit 18 is attached to a portion (region) 11b adjacent to a portion 11a, to which the plug-in relay 2 is attached. That is, in the configuration of Embodiment 2, two horns 10a and 10b provided in the horn device are used as an alarm device constituting an antitheft device, and horn sound is output as alarm sound.

As shown in FIG. 5, similarly to the disconnection detection unit 18 of Embodiment 1, the disconnection detection unit 18 of Embodiment 2 has a power supply circuit 26, a disconnection detection alarm control circuit 27, a sensor output circuit 28, an input I/F 29, an output I/F 30, and a diode 33. At this time, in the disconnection detection unit 18 of Embodiment 2, the configurations of the sensor output circuit 28 and a reference voltage output from a reference power supply in the input I/F 29 are different.

Hereinafter, the sensor output circuit 28 and the input I/F 29 will be described in detail. As will be apparent from FIG. 5, the sensor output circuit 28 of Embodiment 2 includes a MOS transistor 31 and a constant current circuit 34, and the power supply and the constant current circuit 34 are electrically connected to each other through the MOS transistor 31. With this configuration, the MOS transistor 31 is turned on/off based on an on/off control signal (clock signal or the like) supplied from the disconnection detection alarm control circuit 27 to limit power supply from the power supply to the constant current circuit 34. That is, in the configuration of the disconnection detection unit 18 of Embodiment 2, the supply of power to the constant current circuit 34 is limited by the MOS transistor 31, whereby a constant current for disconnection detection supplied to wire harnesses 9a and 9b through the constant current circuit 34, a diode 33 connected in series to the constant current circuit 34, and a connection terminal 21b fitted to a connection terminal 19a is reduced.

The input I/F 29 has a reference power supply (not shown) which generates a reference voltage and a comparator, and compares the voltage between the constant current circuit 34 and the diode 33, that is, the output voltage of the sensor output circuit 28 with the reference voltage. The output of the comparator is output to the disconnection detection alarm control circuit 27 as the output of the input I/F 29, and the disconnection detection alarm control circuit 27 can determine the presence or absence of disconnection of the wire harnesses 9a and 9b based on the output timing of the on/off control signal and the output of the input I/F 29.

With the above configuration, in the disconnection detection unit 18 of Embodiment 2, the on/off state of a contact circuit 4 of the plug-in relay 2 is controlled based on the comparison of the voltage between the constant current circuit 34 and the diode 33, that is, the voltage applied to the wire harnesses 9a and 9b and the reference voltage independently from a horn SW 5. As a result, even in a case where one wire harness of the two wire harnesses 9a and 9b is disconnected (cut), drive power from the battery is supplied to a horn connected to a connected (uncut) wire harness through the connected (uncut) wire harness from the contact circuit 4 of the plug-in relay 2, and horn sound is output as alarm sound.

Next, the reference voltage which is output from the reference power supply will be described. As will be apparent from FIGS. 4 and 5, when the MOS transistor 31 is turned on, the constant current output from the constant current circuit 34 flows to the ground (GND) through the two horns 10a and 10b. Accordingly, when viewed from the constant current circuit 34, the two horns 10a and 10b have a relationship of parallel connection. Therefore, in the horn device of Embodiment 2, the voltage of the wire harnesses 9a and 9b in a case where the constant current is supplied, that is, a voltage V1 input to the input I/F 29 becomes V1=Iset×Rhigh×Rlow/(Rhigh+Rlow) in a case where the internal resistance of the horn 10a is Rhigh, the internal resistance of the horn 10b is Rlow, and the constant current supplied from the constant current circuit 34 is Iset.

For example, in a case where the wire harness 9a connected to the high-tone horn 10a is cut, the voltage of the wire harness 9b, that is, a voltage V2 input to the input I/F 29 becomes V2=Iset×Rlow since the constant current Iset is supplied only to the horn 10b. Similarly, in a case where the wire harness 9b connected to the low-tone horn 10b is cut, the voltage of the wire harness 9a, that is, a voltage V3 input to the input I/F 29 becomes V3=Iset×Rhigh.

Accordingly, for example, in a case where Rhigh≥Rlow, the relationship of V3≥V2>V1 is established; thus, in a case where the reference voltage output from the reference power supply in the input I/F 29 is Vref, the reference voltage is set to a voltage between the voltage V2 and the voltage V1, that is, a voltage satisfying V2>Vref>V1, it is possible to detect disconnection of the wire harnesses 9a and 9b (including internal coils of the horns 10a and 10b or the like). Similarly, in a case of Rhigh≤Rlow, the relationship of V2≥V3>V1 is established; thus, the reference voltage Vref is set to a voltage satisfying V3>Vref>V1, whereby it is possible to detect disconnection of the wire harnesses 9a and 9b.

Therefore, in the reference power supply of the input I/F 29 of the disconnection detection unit 18 provided in the disconnection detection circuit of Embodiment 2, a voltage between the voltages V2 and V3 in a case where only a horn having smaller internal resistance of the two horns 10a and 10b is connected and the constant current Iset flows and the voltage V1 in a case where both of the two horns 10a and 10b are connected and the constant current Iset flows is set as the reference voltage Vref.

The disconnection detection device of Embodiment 2 including the disconnection detection unit 18 and the input I/F 29 configured as above, the constant current Iset for disconnection detection is supplied discontinuously from the sensor output circuit 28 to the wire harnesses 9a and 9b and the horns 10a and 10b based on the control signal from the disconnection detection alarm control circuit 27. At this time, the disconnection detection alarm control circuit 27 monitors the output of the input I/F 29 and determines that any of the wire harnesses 9a and 9b is disconnected (cut) in a case where the input voltage to the input I/F 29 has become greater than the reference voltage Vref at the time of the supply of the constant current for disconnection detection, and the disconnection detection alarm control circuit 27 controls the output I/F 30 to turn on the plug-in relay 2. When the plug-in relay 2 is turned on, at least the horn 10a or 10b connected to the uncut wire harness of the wire harnesses 9a and 9b is driven, and horn sound is output as alarm sound; therefore, similarly to the disconnection detection device of Embodiment 1, it is possible to improve antitheft performance.

In the disconnection detection device of Embodiment 2, the wire harness 25 for disconnection detection of Embodiment 1 is not required; therefore, in particular, even in a case of mounting (attaching) the disconnection detection device in an existing horn device later, it is possible to obtain a remarkable effect capable of easily attaching the disconnection detection device.

In the configuration of Embodiment 2, as in Embodiment 1, the constant current Iset supplied from the constant current circuit 34 may be decreased, whereby the MOS transistor 31 may not be used, that is, power may be supplied directly from the connection terminal 19b to the constant current circuit 34, and the constant current Iset may be constantly supplied to the wire harnesses 9a and 9b and the horns 10a and 10b.

Embodiment 3

Figure 6:
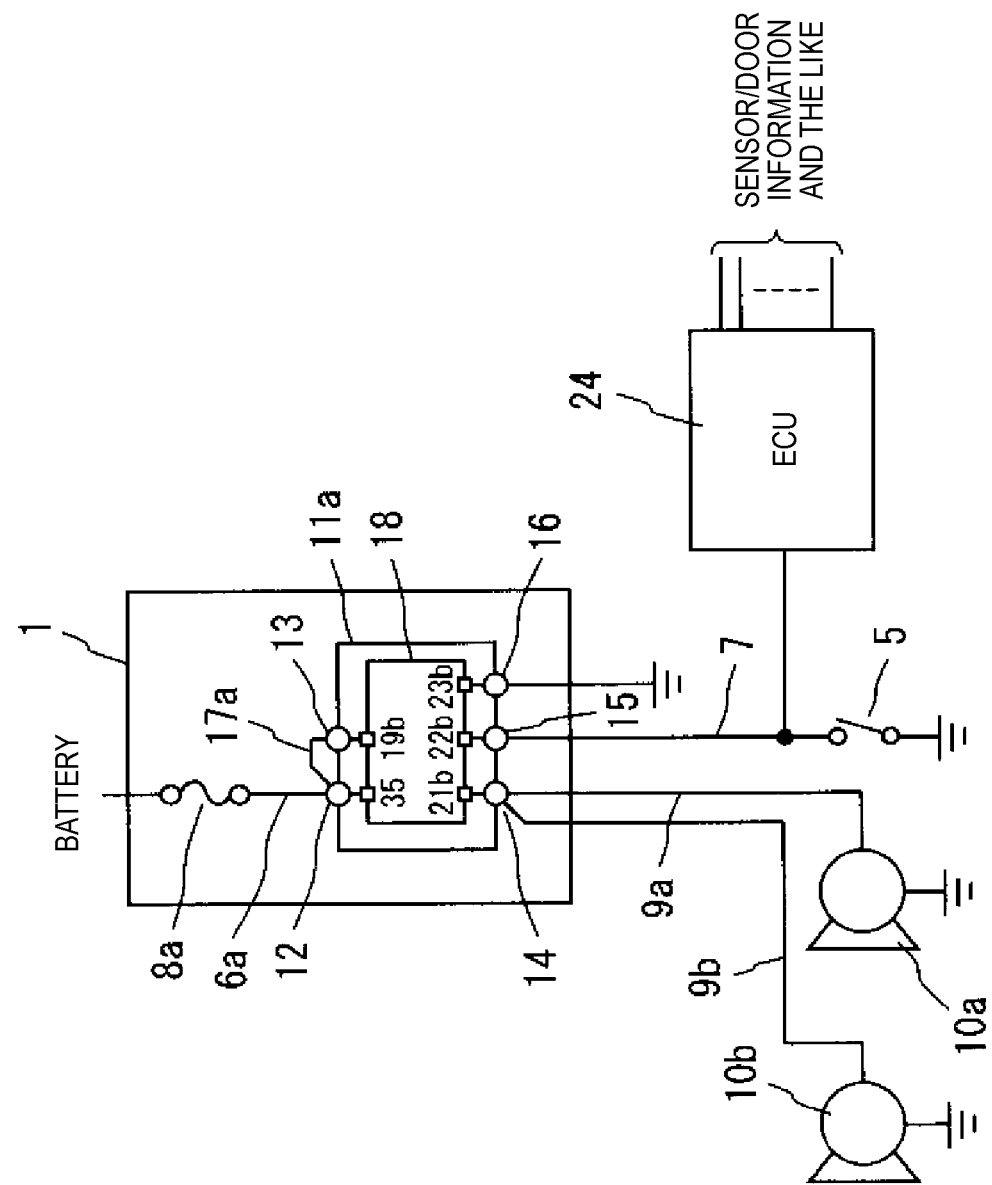
FIG. 6 is a diagram illustrating the schematic configuration of a horn device including a disconnection detection device of Embodiment 3 of the invention.
Figure 7:
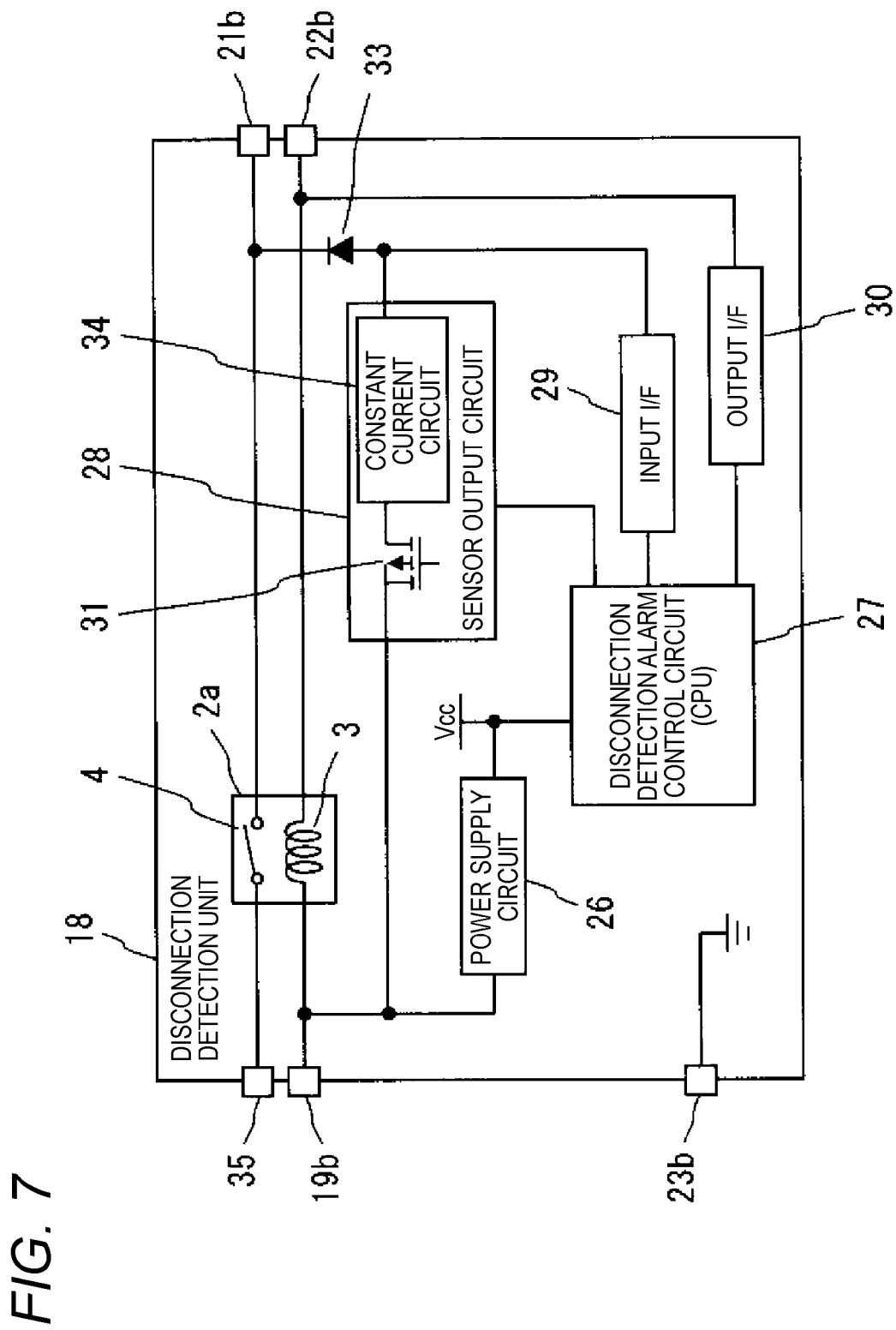
FIG. 7 is a diagram illustrating the schematic configuration of a disconnection detection unit of Embodiment 3 of the invention.

FIG. 6 is a diagram illustrating the schematic configuration of a horn device including a disconnection detection device of Embodiment 3 of the invention, and FIG. 7 is a diagram illustrating the schematic configuration of a disconnection detection unit of Embodiment 3 of the invention. Hereinafter, the disconnection detection device of Embodiment 3 and the horn device including the same will be described referring to FIGS. 6 and 7. The horn device of Embodiment 3 has the same configuration as that of the horn device including the disconnection detection device of Embodiment 2 except for the internal configuration of the disconnection detection unit 18 and the attachment portion 11a of the disconnection detection unit 18. Accordingly, in the following description, the internal configuration of the disconnection detection unit 18 will be described in detail.

As shown in FIG. 6, in the horn device including the disconnection detection device of Embodiment 3, even in a relay box 1 in which there is no portion for attaching a plug-in relay for a security horn, it is possible to attach the disconnection detection device of the wire harnesses 9a and 9b. That is, in the disconnection detection device of Embodiment 3, as described below in detail, a relay circuit 2a having a coil 3 and a contact circuit 4 is provided in the disconnection detection unit 18. Accordingly, in the disconnection detection device of Embodiment 3, after the conventional plug-in relay 2 (not shown) is detached, the disconnection detection unit 18 of Embodiment 3 is attached to a detached portion 11a, whereby it is possible to add a disconnection (cut) detection function of the wire harnesses 9a and 9b to the horn device. As a result, in the configuration of Embodiment 3, in a case where the two horns 10a and 10b provided in the horn device are used as an alarm device constituting an antitheft device, and horn sound is output as alarm sound, it is possible to improve antitheft performance.

Hereinafter, the configuration and disconnection (cut) detection operation of the disconnection detection unit 18 of Embodiment 3 will be described in detail referring to FIGS. 6 and 7.

As shown in FIG. 7, the disconnection detection unit 18 of Embodiment 3 includes the relay circuit 2a having the coil 3 and the contact circuit 4 along with a power supply circuit 26, a disconnection detection alarm control circuit 27, a sensor output circuit 28, an input I/F 29, an output I/F 30, and a diode 33 provided in the disconnection detection unit 18 of Embodiment 2. At this time, in the configuration of Embodiment 3, the disconnection detection unit 18 is connected to the power supply through a connection terminal 19b fitted to a connection terminal 13, and power is supplied to one side of the coil 3, the power supply circuit 26, and the sensor output circuit 28. The disconnection detection unit 18 is connected to the power supply through a connection terminal 35 fitted to a connection terminal 12, and power is supplied to one side of the contact circuit 4. The other side of the contact circuit 4 and the cathode (negative electrode) of the diode 33 are respectively connected to the wire harnesses 9a and 9b through a connection terminal 21b fitted to a connection terminal 14. In addition, the other side of the coil 3 and the output of the output I/F are respectively connected to the wire harness 7 through a connection terminal 22b fitted to a connection terminal 15.

In the disconnection detection device of Embodiment 3 including the disconnection detection unit 18 configured as above, as in Embodiment 2, the constant current Iset for disconnection detection is supplied discontinuously from the sensor output circuit 28 to the wire harnesses 9a and 9b and the horns 10a and 10b based on the control signal from the disconnection detection alarm control circuit 27. At this time, the disconnection detection alarm control circuit 27 monitors the output of the input I/F 29. It is determined that any of the wire harnesses 9a and 9b is disconnected (cut) in a case where the input voltage to the input I/F 29 has become greater than the reference voltage Vref at the time of the supply of the constant current for disconnection detection, and the disconnection detection alarm control circuit 27 controls the output I/F 30 to turn on the plug-in relay 2. When the plug-in relay 2 is turned on, at least the horn 10a or 10b connected to the uncut wire harness of the wire harnesses 9a and 9b is driven, and horn sound is output as alarm sound; therefore, similarly to the disconnection detection device of Embodiments 1 and 2, it is possible to improve antitheft performance.

Figure 10:
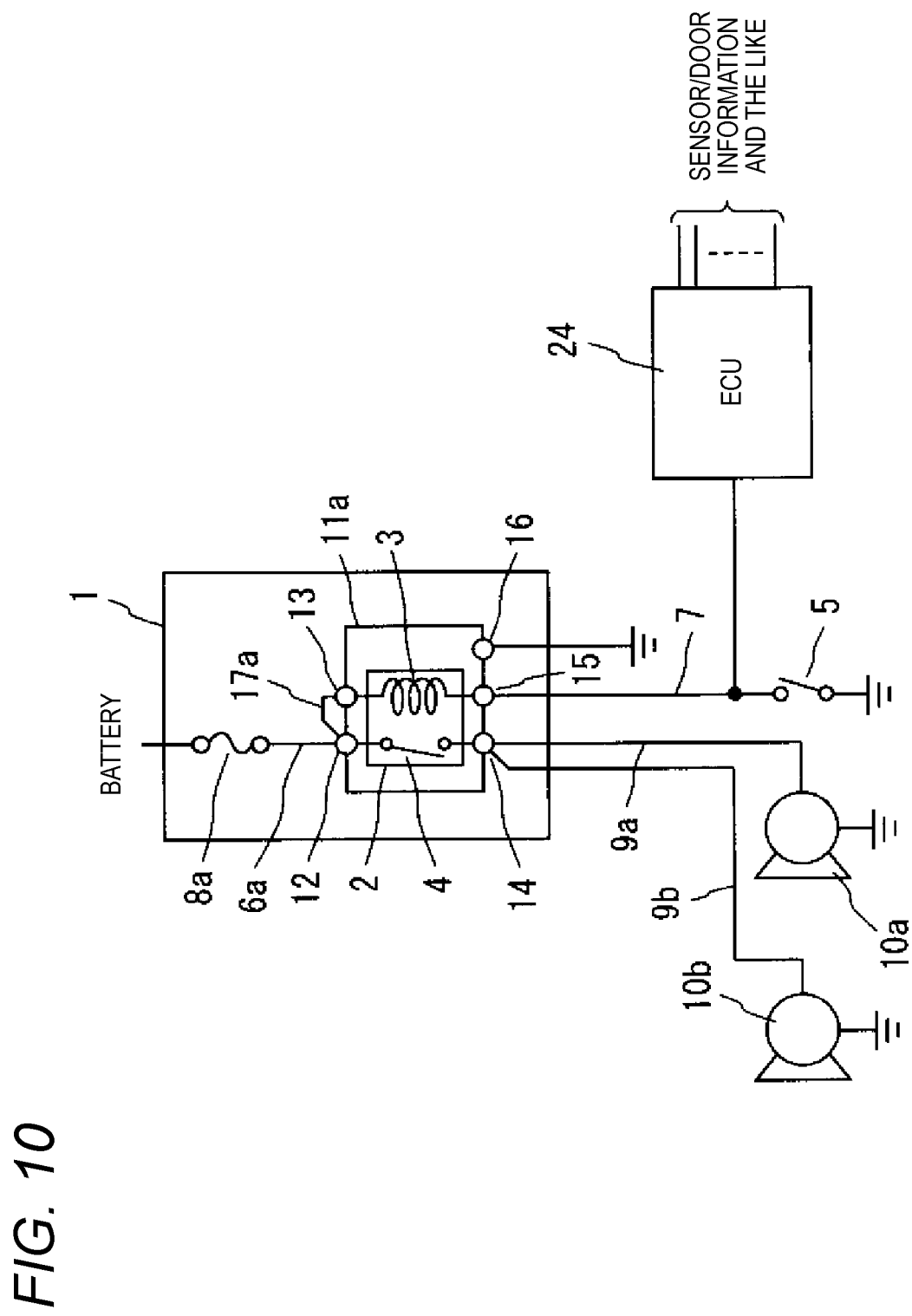
FIG. 10 is a diagram illustrating the schematic configuration of a conventional horn device which includes a relay box having no attachment portion of a plug-in relay for a security horn.

In the disconnection detection device of Embodiment 3, the power supply circuit 26, the disconnection detection alarm control circuit 27, the sensor output circuit 28, the input I/F 29, the output I/F 30, the diode 33, and the relay circuit 2a are disposed in the same disconnection detection unit 18, and are connected to one another in the disconnection detection unit 18. Accordingly, even in a conventional horn device which includes a relay box 1 having no portion 11b for attaching a plug-in relay 2 for a security horn shown in FIG. 10, it is possible to provide a disconnection detection device which detects disconnection of the wire harnesses 9a and 9b constituting the horn device and gives an alarm. At this time, in the configuration of Embodiment 3, the disconnection detection unit 18 is only attached to the portion 11a where the conventional plug-in relay 2 is detached, whereby it is possible to obtain a remarkable effect capable of more easily attaching the disconnection detection device even if the disconnection detection device is mounted later, in addition to the effects of Embodiment 2.

The disconnection detection unit 18 of the disconnection detection device of Embodiment 3 may have a configuration in which a relay circuit 2a having a coil 3 and a contact circuit 4 is provided in the disconnection detection unit 18 of Embodiment 1. In this case, for example, the wire harness 25 for disconnection detection arranged along the wire harnesses 9a and 9b is connected to the connection terminal 13 after the wiring 17a is removed, and the connection terminal 21b fitted to the connection terminal 13 is provided. In addition, power is supplied from the connection terminal 19b to one end of the contact circuit 4 without the connection terminal 35 being provided.

The features of the disconnection detection device according to the embodiments of the invention will be briefly summarized and listed in the following items [1] to [7].

[1] A disconnection detection device which is provided in a vehicle having a horn device including at least two horns (10a and 10b) configured to generate horn sound, a horn switch (5) configured to be turned on/off corresponding to an operation of a horn button, a plug-in relay (2) disposed in a relay box and configured to supply drive power to the two horns by turning on a contact circuit corresponding to turning on the horn switch, and wire harnesses (9a and 9b) configured to electrically connect the plug-in relay and the two horns, the disconnection detection device comprising:

a disconnection detection unit (18) including a constant current circuit (34) configured to supply a constant current for disconnection detection to the two horns through the wire harnesses and a disconnection detection circuit (input I/F 29, disconnection detection alarm control circuit 27, and output I/F 30) configured to determine the presence or absence of disconnection of the wire harnesses by monitoring an output voltage of the constant current circuit and configured to supply drive power through the wire harnesses by turning on the contact circuit independently of the horn switch in a case where disconnection of the wire harnesses has been detected, wherein the disconnection detection unit is disposed in the relay box along with the plug-in relay.

[2] The disconnection detection device described in [1], wherein connection terminals (19b, and 21b to 23b) for external connection of the disconnection detection unit are disposed similarly to connection terminals for external connection of the plug-in relay.

[3] The disconnection detection device described in [1], wherein the plug-in relay and the disconnection detection unit are formed integrally, and wherein a relay having the contact circuit, the constant current circuit, and the disconnection detection circuit are disposed in a same housing.

[4] The disconnection detection device described in [3], wherein connection terminals for external connection electrically connecting the constant current circuit, the disconnection detection circuit, and the relay which are disposed in the same housing, are disposed similarly to connection terminals for external connection of the plug-in relay.

[5] The disconnection detection device described in any one of [1] to [4], further comprising:

a constant current supply control circuit (MOS transistor 31) which alternately performs the supply and stop of the constant current for disconnection detection supplied from the constant current circuit.

[6] A disconnection detection device which is provided in a vehicle having a horn device including at least two horns (10a and 10b) configured to output horn sound, a horn switch (5) configured to be turned on/off corresponding to an operation of a horn button, a plug-in relay (2) disposed in a relay box and configured to supply drive power to the two horns by turning on a contact circuit corresponding to turning on the horn switch, and first wire harnesses (9a and 9b) configured to electrically connect the plug-in relay and the two horns, the disconnection detection device comprising:

a second wire harness (25) which is arranged along the first wire harnesses; and a disconnection detection unit which includes a current circuit (sensor output circuit 28) configured to supply a current for disconnection detection to the second wire harness and a disconnection detection circuit configured to monitor an output voltage of the current circuit and configured to supply drive power through the first wire harnesses by turning on the contact circuit independently from the horn switch in a case where disconnection of the second wire harness has been detected, wherein the disconnection detection unit is disposed in the relay box along with the plug-in relay.

[7] The disconnection detection device described in [6], further comprising:

a current supply control circuit (MOS transistor 31) which alternately performs the supply and stop of the current for disconnection detection supplied from the current circuit.

According to the embodiments, it is possible to improve the antitheft performance of the horn device body. The invention achieving this advantage is useful for the disconnection detection device which detects the cut (disconnection) of the wire harness connecting the relay and the horn.

DESCRIPTION OF REFERENCE NUMERALS AND SIGNS

1: relay box
2, 2a: plug-in relay
3, 3a: coil
4, 4a: contact circuit
5: horn switch (horn SW)
6a, 6b, 7, 9a, 9b: wire harness
8a, 8b: fuse
10a, 10b: horn
12 to 16, 19a to 23a: relay box-side connection terminal
19b, 21b to 23b, 35: disconnection detection unit-side connection terminal 17a, 17b: wiring
18: disconnection detection unit
24: ECU
25: wire harness for disconnection detection
26: power supply circuit
27: disconnection detection alarm control circuit
28: sensor output circuit
29: input I/F
30: output I/F
31: MOS transistor
32: resistor (resistive element)
33: diode
34: constant current circuit
36: security horn

What is claimed is:

1. A disconnection detection device which is provided in a vehicle having a horn device including at least two horns configured to generate horn sound, a horn switch configured to be turned on/off corresponding to an operation of a horn button, a plug-in relay disposed in a relay box and configured to supply drive power to the at least two horns by turning on a contact circuit corresponding to turning on the horn switch, and wire harnesses configured to electrically connect the plug-in relay and the at least two horns, the disconnection detection device comprising:
a disconnection detection unit including a constant current circuit configured to supply a constant current for disconnection detection to the at least two horns through the wire harnesses, and a disconnection detection circuit configured to determine the presence or absence of disconnection of the wire harnesses by monitoring an output voltage of the constant current circuit and configured to supply drive power through the wire harnesses by turning on the contact circuit independently of the horn switch in a case where disconnection of the wire harnesses has been detected,
wherein the disconnection detection unit is disposed in the relay box along with the plug-in relay.

2. The disconnection detection device according to claim 1, wherein connection terminals for external connection of the disconnection detection unit are disposed similarly to connection terminals for external connection of the plug-in relay.

3. The disconnection detection device according to claim 1, wherein the plug-in relay and the disconnection detection unit are formed integrally, and wherein a relay having the contact circuit, the constant current circuit, and the disconnection detection circuit are disposed in a same housing.

4. The disconnection detection device according to claim 3, wherein connection terminals for external connection electrically connecting the constant current circuit, the disconnection detection circuit, and the relay which are disposed in the same housing, are disposed similarly to connection terminals for external connection of the plug-in relay.

5. The disconnection detection device according to claim 1, further comprising:
a constant current supply control circuit which alternately performs the supply and stop of the constant current for disconnection detection supplied from the constant current circuit.

6. A disconnection detection device which is provided in a vehicle having vehicle has a horn device including at least two horns configured to output horn sound, a horn switch configured to be turned on/off corresponding to an operation of a horn button, a plug-in relay disposed in a relay box and configured to supply drive power to the at least two horns by turning on a contact circuit corresponding to turning on the horn switch, and first wire harnesses configured to electrically connect the plug-in relay and the at least two horns, the disconnection detection device comprising:
a second wire harness which is arranged along the first wire harnesses; and
a disconnection detection unit which includes a current circuit configured to supply a current for disconnection detection to the second wire harness and a disconnection detection circuit configured to monitor an output voltage of the current circuit and configured to supply drive power through the first wire harnesses by turning on the contact circuit independently from the horn switch in a case where disconnection of the second wire harness has been detected,
wherein the disconnection detection unit is disposed in the relay box along with the plug-in relay.

7. The disconnection detection device according to claim 6, further comprising:
a current supply control circuit which alternately performs the supply and stop of the current for disconnection detection supplied from the current circuit.

* * * * *